US010730611B2

(12) United States Patent
Utt (10) Patent No.: US 10,730,611 B2
(45) Date of Patent: Aug. 4, 2020

(54) SHORT TAKE OFF AND LANDING AIRCRAFT WITH ADJUSTABLE VORTICES DEVICE

(71) Applicant: Larry Utt, Hazel Green, AL (US)

(72) Inventor: Larry Utt, Hazel Green, AL (US)

( * ) Notice: Subject to any disclaimer, the term of this patent is extended or adjusted under 35 U.S.C. 154(b) by 298 days.

(21) Appl. No.: 16/025,081

(22) Filed: Jul. 2, 2018

(65) Prior Publication Data
US 2020/0001982 A1 Jan. 2, 2020

(51) Int. Cl.
| | |
|---|---|
| *B64C 23/06* | (2006.01) |
| *B64C 21/10* | (2006.01) |
| *B64C 3/38* | (2006.01) |
| *B64C 3/40* | (2006.01) |
| *B64C 9/32* | (2006.01) |
| *B64C 3/14* | (2006.01) |
| *B64C 13/34* | (2006.01) |
| *F16H 19/04* | (2006.01) |
| *B64C 13/40* | (2006.01) |
| *B64C 15/02* | (2006.01) |
| *B64C 3/36* | (2006.01) |

(52) U.S. Cl.
CPC ............... *B64C 21/10* (2013.01); *B64C 3/14* (2013.01); *B64C 3/385* (2013.01); *B64C 3/40* (2013.01); *B64C 9/32* (2013.01); *B64C 13/34* (2013.01); *B64C 13/40* (2013.01); *B64C 15/02* (2013.01); *B64C 23/072* (2017.05); *F16H 19/04* (2013.01); *B64C 3/36* (2013.01); *B64C 2003/148* (2013.01); *B64C 2230/26* (2013.01)

(58) Field of Classification Search
CPC .............. B64C 3/36; B64C 3/58; B64C 23/06
See application file for complete search history.

(56) References Cited

U.S. PATENT DOCUMENTS

| | | | | |
|---|---|---|---|---|
| 6,105,904 A | * | 8/2000 | Lisy ........................ | B64C 3/58 244/130 |
| 9,488,064 B2 | * | 11/2016 | Perrot ................... | F04D 29/563 |
| 9,752,559 B2 | * | 9/2017 | Herr ........................ | F03D 7/022 |
| 2020/0114986 A1 | * | 4/2020 | Eulalie ................. | B62D 35/007 |

* cited by examiner

*Primary Examiner* — Brian M O'Hara
(74) *Attorney, Agent, or Firm* — AdamsIP, LLC; Edward B. Garner, III; J. Hunter Adams (57) ABSTRACT

An improved aircraft system is provided. The improved aircraft system comprises an adjustable vortices device that may be attached to an aircraft to create various vortices effects, which increase take-off weight and improve low-speed handling of the aircraft. The adjustable vortices device comprises a linear actuator, a pivot mechanism, and a vortex generator. The pivot mechanism is operably connected to the linear actuator in a way such that the translational energy of the linear actuator causes the pivot mechanism to rotate about a central axis. The vortex generator is moveably attached to a surface of the aircraft and coupled to the pivot mechanism in a way such that rotating the pivot mechanism causes the vortex generator to rotate about a central axis, which alters the angle the vortex generators move through the air.

26 Claims, 5 Drawing Sheets

SHORT TAKE OFF AND LANDING AIRCRAFT WITH ADJUSTABLE VORTICES DEVICE

FIELD OF THE INVENTION

The present invention relates generally to an adjustable vortices device that may be attached to an aircraft to create vortices that improve low-speed handling.

BACKGROUND

It is often beneficial for an aircraft to be able to take off and land on very short runways. This is especially true for military aircraft that often must take off and land in very short distances whether in combat or out of combat. For instance, aircraft taking off the deck of an aircraft carrier must take off and land on a runway no more than about three hundred feet. This means for many military aircraft it's optimal that it be able to generate enough lift in a very short distance to overcome its weight. It also means that the aircraft must be able to be operated at very low speeds in order to effectively land in such a short distance. Currently most military cargo aircraft need a minimum of two thousand feet to effectively takeoff and land. Optimally a military cargo aircraft would be able to take off and land over much shorter distances, but that would require increasing the lift of the aircraft while as well as the low speed control of the aircraft. Unfortunately, most cargo aircraft are very difficult to control at low speeds and operating a cargo aircraft at low speeds often results in accidents due to stalling.

Stalls are experienced as a sudden reduction in lift when the critical angle of attack of a wing is exceeded. Often this is a result of slowing the aircraft below the minimum stall speed for a given angle of attack during level flight. When this occurs, many aircraft will start to lose elevation and cause the nose to pitch down because the wing is no longer producing enough lift to support the aircraft's weight. To recover from a stall in a fixed wing aircraft, the angle of attack must be reduced and the speed of the aircraft must be increased so that airflow over the surfaces of the wing system is normalized. Some aircraft are equipped with systems that allow the angle of incidence of the aircraft to be changed, which may be used to increase or decrease the angle of attack without pitching the nose of the aircraft. Additionally, some aircraft allow the sweep of the wings to be altered, which may increase or decrease the critical angle of attack of an aircraft without pitching the nose or increasing the speed due to an increase in the lift generated by the aircraft by sweeping the wings forward. Various other technologies have been created to reduce the stall speed of an aircraft with mixed success. One such technology is vortex generators.

Vortex generators, which look like small fins perched on the surfaces of the aircraft, improve an aircraft's aerodynamic performance by delaying boundary layer separation. The boundary layer is a small layer of air that surrounds the aircraft and is somewhat slow moving compared to the aircraft as it moves through the air. Because of this, as the aircraft moves through the air, the boundary layer falls behind the aircraft and creates a wake, which creates drag. Drag acts on the aircraft by slowing the aircraft down and reduces the amount of lift force effectively generated by the aircraft. Vortex generators may be used to delay the separation of the boundary layer from the aircraft by creating minor turbulence in the form of vortices. This turbulence gives the boundary layer more energy, which allows it to separate from the aircraft system at a later time. This later separation results in a smaller wake, resulting in less drag acting on the aircraft. Smaller wake also effectively increases the lift generated by the aircraft, which both decreases the speed needed to overcome the weight of the aircraft to achieve take off and decreases the minimum stall speed. In effect, an aircraft having a vortex generator may both take off and land over shorter distances.

Currently, vortex generators are attached to the aircraft in a permanent orientation. This isn't always advantageous because the effectiveness of vortex generators is increased or decreased depending on the angle of attack it creates with the upcoming flow of air. For instance, a vortex generator having a high angle of attack with the upcoming airflow may create a large vortex, but this may take a lot of energy to create, thus creating more friction drag that it reduces drag caused by flow separation. Alternatively, a vortex generator having an angle of attack parallel to upcoming flow of air will produce very small vortices, which will have a minimal effect on drag caused by flow separation. Additionally, the effectiveness of vortex generators varies with the angle of attack of the wings of the aircraft. This means that current aircraft having vortex generators may only notice the reduced drag and improved flight performance under a very narrow set of circumstances.

Accordingly, a need exists in the art for an improved aircraft system having an adjustable vortices device that may take off and land over short distances as well as be able to fly over long distances without having to stop and refuel.

SUMMARY

In one aspect, an aircraft optimized to take off and land within less than three hundred feet is provided. Carried out to the fullest embodiment, the aircraft may stop all forward momentum in air and perform a controlled drop to a landing spot. The aircraft may be optimized to carry a tank to a battle front and land in areas no longer than three hundred feet before taking off again within the same distance. Additionally, the aircraft may be optimized to pick up wounded soldiers and carry them directly to the nearest medical facility so medical assistance in a hospital environment may be quickly provided.

In another aspect, an improved vortices generation device that may be attached to an aircraft to create various vortices effects to increase take-off weight and low-speed handling is provided. The improved aircraft system comprises a fuselage, a wing system having an adjustable vortices device, a landing gear, an aeronautic stabilizer, and an engine. The wing system, landing gear, and aeronautic stabilizer are coupled to the fuselage. The aeronautic stabilizer may be attached to the fuselage along the traverse axis and/or vertical axis of the aircraft system to provide longitudinal stability/control and directional stability/control respectively. In some embodiments of the aircraft system, a single aeronautic stabilizer may be used. The engine may be attached to either the fuselage or the wing system and is configured to produce thrust, which propels the aircraft system in a way such that fluid moves over the wing system to generate lift.

The wing system comprises a streamlined airfoil-contoured body defined by an internal structure, an upper surface coupled to the internal structure, and a lower surface coupled to the internal structure. The streamlined airfoil-contoured body is arranged such that the fluid moves at a higher average velocity over the upper surface than the lower surface. Assuming that the angle of attack is at least zero when propelled through the fluid, the wing system is designed to generate lift. The adjustable vortices device is operably connected to the streamlined airfoil-contoured body so that vortices are created, which reduce drag acting on the streamlined airfoil-contoured body. The adjustable vortices device comprises a linear actuator, a pivot mechanism, and a vortex generator. The linear actuator is configured to convert rotational energy into translational energy. The pivot mechanism is operably connected to the linear actuator in a way such that the translational energy of the linear actuator causes the pivot mechanism to rotate about a central axis. The vortex generator is coupled to the pivot mechanism in a way such that rotating the pivot mechanism causes the vortex generator to rotate about a central axis.

In a preferred embodiment, the linear actuator and pivot mechanism are disposed within the internal structure of the streamlined airfoil-contoured body. The vortex generators may be perched on the upper surface and/or the lower surface of the streamlined airfoil-contoured body. This allows the vortex generators to be rotated on the surface of the wings to create various vortex effects that minimizes the amount of drag acting on the aircraft system. The wing system may further comprise apertures on the upper surface and/or lower surface, allowing the vortex generators to be ensconced within the streamlined airfoil-contoured body. The vortex generators may be extended through the apertures to the upper surface and/or lower surface. When the vortex generators are ensconced within the streamlined airfoil-contoured body, a cover may hide the apertures to enhance aerodynamic flow over the wings. When a user wants to use the vortex generators, the covers may be retracted before extension of the vortex generators through the apertures.

The streamlined airfoil-contoured body may further comprise a first wing half and a second wing half, wherein the first wing half and the second wing half are operably connected via a joint system. The first wing half may be coupled to the second wing to create a wing system. In a preferred embodiment, the first wing half and the second wing half may be shaped such that when coupled together the upper surfaces of the wing halves are in plane with one another, making one seamless upper surface. In another preferred embodiment, the first wing half and second wing half may be joined via a joint system comprising a hinge and a hydraulic device. Preferably, the second wing half may be pivoted out of plane with the first wing half about the hinge. The hydraulic device may be disposed within the first internal structure of the first wing half and may be operably connected to the second wing half of the wing system in a way such that operation of the hydraulic device may cause the second wing half to rotate about the hinge so that it is in an in-plane position and/or an out-of-plane position with the first wing half. In another preferred embodiment, the hydraulic device may be configured to lock in a way such that the second wing half is held in an in-plane position and/or an out-of-plane position with the first wing half.

In another preferred embodiment, the aircraft system may further comprise an angle adjustment mechanism. Because the angle of incidence allows for a higher angle of attack during takeoff and landing, the aircraft system may take-off and land in shorter distances. The angle adjustment mechanism may also be used to alter the angle of attack of the aircraft system while being propelled through a fluid by the engine. The angle adjustment mechanism may be used to change the angle of incidence manually and/or automatically. Preferably, the angle adjustment mechanism comprises a hydraulic device and a rotation device coupled to the fuselage and operably connected to the wing system. In a preferred embodiment, the rotation device is a hinge; however, one with skill in the art will recognize that the rotation device may be any device that will allow the wing system to rotate about a central axis in relation to said fuselage in a way such that the chord angle of the wing system may be changed. In another preferred embodiment, the hydraulic device may be coupled to the wing system in a way such that the leading-edge of the wing system may be moved about said rotation device by the hydraulic device. In a preferred embodiment, the hydraulic device may lock the wing system in a desired position relative the fuselage, which in turn locks an angle of incidence for the aircraft system.

In another preferred embodiment, the aircraft system may further comprise a sweeping mechanism. The sweeping mechanism may adjust the sweep angle of the wing system in a way such that the wing system may be placed in a swept forward position, straight position, and/or swept back position. The sweep angle of the aircraft system may be changed manually or automatically by the sweeping mechanism. The sweeping mechanism may comprise a hydraulic device and a wing pivot coupled to the fuselage. The wing system may be operably connected to the wing pivot in a way such that the wing system may rotate around about the traverse axis of the aircraft system via the wing pivot, thus changing the sweep angle of the wing system. The hydraulic device may be attached to the fuselage and operably connected to the wing system in a way such that operation of the hydraulic device may cause the wing system to rotate about the wing pivot.

In another preferred embodiment, the aircraft system may further comprise an external fuel tank. The external fuel tank may be configured to provide propellant to a main fuel tank of the aircraft system. The transfer of propellant from the external fuel tank to the main fuel tank may be done at a constant rate or a variable rate. The transfer of propellant from the external fuel tank to the main fuel tank may also be automatic or manual. In a preferred embodiment, the external fuel tank is removable. The removal of the external fuel tank from the aircraft system may be done manually and/or automatically. In a preferred embodiment, a pyrotechnic fastener or electronic lock may be manipulated to jettison the external fuel tank from the aircraft system.

In another preferred embodiment, the aircraft system may further comprise an airbrake system. The airbrake system comprises at least one panel, a hinge coupled to the fuselage, and a hydraulic device. The at least one panel is shaped in a way such that when making face sharing contact with the fuselage, the at least one panel conforms to the fuselage. The hinge may be operably connected to the at least one panel in a way such that the at least one panel may rotate about a central axis, allowing the at least one panel to rotate out of face sharing contact with the fuselage. The airbrake system may be deployed manually and/or automatically. In a preferred embodiment, the hydraulic device may be used lock the airbrake system in face sharing contact with the fuselage or out of face sharing contact with the fuselage. Preferably, the airbrake system may comprise a frilled airbrake and a rear airbrake. The frilled airbrake is disposed around the fuselage and is forward of the rear airbrake, which is also disposed around the fuselage. The frilled airbrake and rear airbrake are disposed around the fuselage in a way such that the at least one panel of the frilled airbrake overlaps the at least one panel of the rear airbrake when rotated out of face sharing contact with the fuselage and viewed down the longitudinal axis of the aircraft system.

In another preferred embodiment, the aircraft system may further comprise a control jet system operably connected to the engine. The control jet system comprises a nozzle, a nozzle pivot, an engine duct, and a hydraulic device. In one preferred embodiment, the nozzle may be rotated about the nozzle pivot in a way such that the nozzle may be placed in a position to direct compressed air from the engine downward along the vertical axis, which may provide thrust about the vertical axis of the aircraft system. The nozzle may be rotated about the nozzle pivot via the hydraulic device. The nozzle may be rotated about the nozzle pivot manually or automatically. In another preferred embodiment, a pitch valve and a roll valve may be used to keep the attitude of the aircraft system constant. The pitch valve and roll valve may be operably connected to the engine in a way such that compressed air from the engine may be directed to the pitch valve and roll valve. Compressed air may be expelled from the pitch valve or roll valve to provide thrust that may affect the attitude of the aircraft system.

In another preferred embodiment, the aircraft system may further comprise a forewing coupled to the fuselage and forward of the wing system. The forewing is attach to the aircraft system along the traverse axis and comprises a streamlined airfoil-contoured body that generates lift when propelled through a fluid at an angle of incidence of at least zero. The forewing is defined by an internal structure, an upper surface coupled to the internal structure, and a lower surface coupled to the internal structure. The streamlined airfoil-contoured body may be arranged in a way such that the fluid moves at a higher average velocity over the upper surface and at a lower average velocity over the lower surface. In some embodiments, the forewing may provide longitudinal control and stability to the aircraft system. Therefore, in some embodiments of the aircraft system, no aeronautic stabilizer needs to be coupled to the fuselage along the traverse axis.

DESCRIPTION OF THE DRAWINGS

These and other features, aspects, and advantages of the present invention will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, ingredients, steps, etc. are optionally present. For example, an article "comprising" components A, B, and C can contain only components A, B, and C, or can contain not only components A, B, and C, but also one or more other components. As defined herein, the term "traverse axis" means the axis that runs from wingtip to wingtip of the aircraft system. As defined herein, the term "longitudinal axis" means the axis that passes through the fuselage from nose to tail. As defined herein, the term "vertical axis" means the axis that passes through the fuselage from top to bottom. As defined herein, the term "angle of attack" means the angle made by the chord line and the vector of the relative of the fluid has the aircraft system moves through the fluid. As defined herein, the term "angle of incidence" means the angle between the chord line and the longitudinal axis. As defined herein, the term "spanwise" means the direction from the center of the wingtip to the center of the wing root of a wing system. As defined herein, the term "chordwise" means the direction from the leading-edge to the trailing-edge of a wing system that runs perpendicular to the spanwise direction of the wing system.

Figure 1:
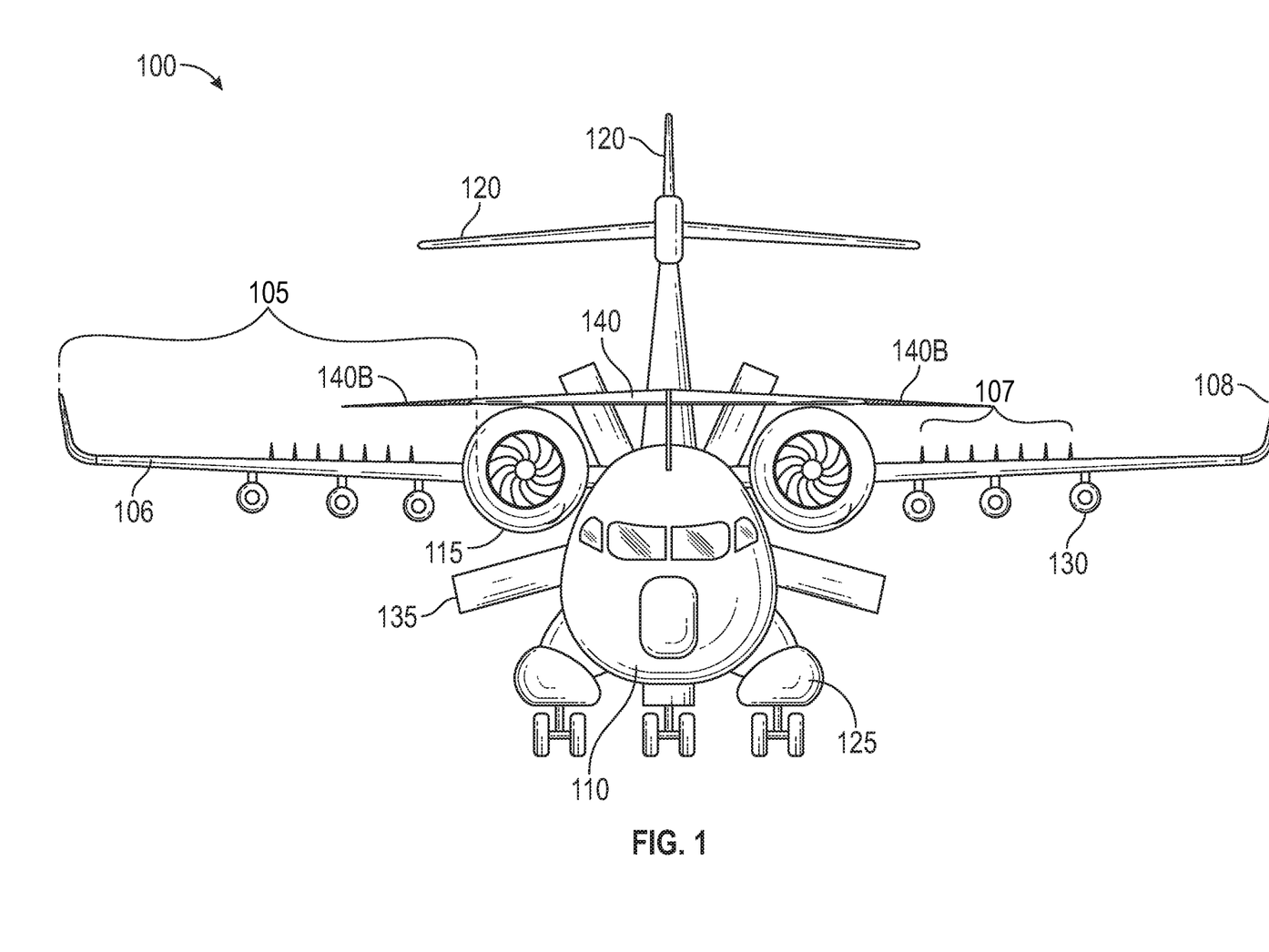
FIG. 1 shows a front view of an aircraft system embodying features of the present invention.

An aircraft system 100 is depicted in FIGS. 1-9. As shown in FIG. 1, the aircraft system 100 may comprise a fuselage 110, a wing system 105 having an adjustable vortices device 107, a landing gear 125, an aeronautic stabilizer 120, and an engine 115. The wing system 105, landing gear 125, and aeronautic stabilizer 120 are coupled to the fuselage 110. The aeronautic stabilizer 120 may be attached to the fuselage 110 along the traverse axis and/or vertical axis to provide directional and longitudinal stability and control to the aircraft system 100, respectively. In some embodiments of the aircraft system 100, a single aeronautic stabilizer 120 may be used. The engine 115 may be attached to either the fuselage 110 or the wing system 105 and is configured to produce thrust, which may propel the aircraft system 100 in a way such that fluid moves over the wing system 105 and generates lift. In other preferred embodiments, the aircraft system 100 may further comprise a joint system 309, cambered winglets 108, an external fuel tank 130, an angle adjustment mechanism 405, a sweeping mechanism 210, an airbrake system 135, a control jet system 304, and a forewing 140.

Figure 8:
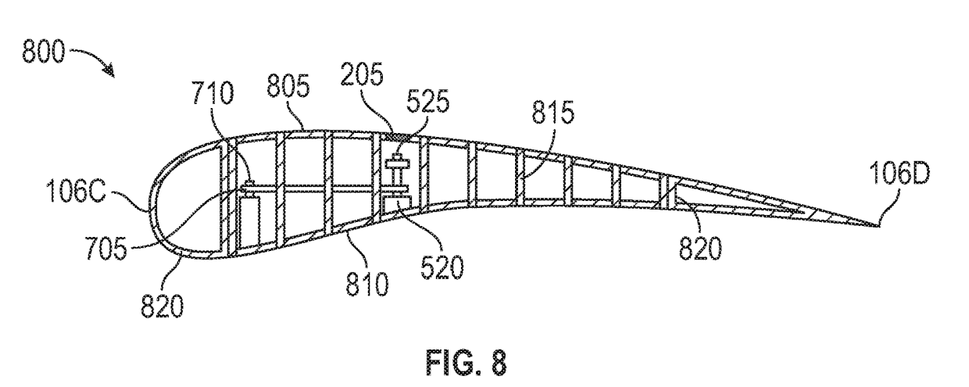
FIG. 8 shows a cross sectional view of a streamlined airfoil-contoured body embodying features of the present invention.
Figure 9:
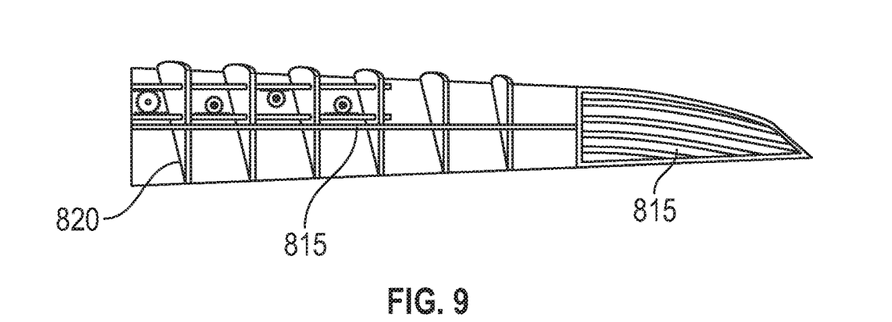
FIG. 9 shows a perspective view of a streamlined airfoil-contoured body embodying features of the present invention.

The wing system 105 comprises a streamlined airfoil-contoured body 106 that generates lift when propelled through a fluid at an angle of attack of at least zero. As shown in FIGS. 8 and 9, the streamlined airfoil-contoured body 106 is defined by an internal structure 800, an upper surface 805 coupled to the internal structure 800, and a lower surface 810 coupled to the internal structure 800. The streamlined airfoil-contoured body 106 is arranged such that the fluid moves at a higher average velocity over the upper surface 805 and at a lower average velocity over the lower surface 810. The shape of the streamlined airfoil-contoured body 106 may be asymmetric or symmetric. In a preferred embodiment, the streamlined airfoil-contoured body 106 has a center of lift forward of the center of gravity of the aircraft system 100. The center of lift is defined as the point where the sum total of all lift generated by the aircraft system 100 balances out to form an aggregate direction in which lift will act on an aircraft system 100 while moving through a fluid. The center of gravity is defined as the average location of the weight of the aircraft system 100.

In a preferred embodiment as illustrated in FIG. 8, the internal structure 800 of the streamlined airfoil-contoured body 106 may comprise spanwise members 815, such as spars and/or stringers, and chordwise members 820, such as ribs, formers and/or bulkheads. In a preferred embodiment, the internal structure 800 may be one of three types: monospar, multispar, or box beam. The monospar type internal structure 800 comprises one spanwise member 815 and chordwise members 820, wherein the chordwise members 820 of the monospar type internal structure 800 may provide the streamlined airfoil-contoured body 106 its shape. The box beam type internal structure 800 uses two spanwise members 815 with connecting chordwise members 820, wherein the chordwise members 820 of the box beam type internal structure 800 shape the leading-edge 106C and trailing-edge 106D of the streamlined airfoil-contoured body 106 as well as provide additional strength to the wing system 105. The multispar type internal structure 800 incorporates at least three spanwise members 815 with connecting chordwise members 820, wherein the chordwise members 820 of the multispar type internal structure 800 shape the leading-edge 106C and trailing-edge 106D of the streamlined airfoil-contoured body 106. In an embodiment, propellant may be carried inside the internal structure of the wing system 105. For instance, the internal structure 800 may be sealed with a fuel resistant sealant, creating a main fuel tank 215 within the wing system 105. In another embodiment, a main fuel tank 215 may be fitted inside the internal structure 800 of the wing system 105, which may further increase the structural stability of the wing system 105.

The type of internal structure 800 and size of the spanwise members 815 and chordwise members 820 depends on the intended purpose of the aircraft system 100. For instance, an aircraft system 100 that is intended to be used as a heavy cargo transportation vehicle may have a wing system 105 comprising a box type internal structure 800 with large spanwise members 815, which may be able to better tolerate the larger tension and compression stresses caused by heavier loads. For instance, an aircraft system 100 that is intended to be used in a way such that flying at high velocities is necessary may have a wing system 105 comprising a plurality of thinner spanwise members 815, which may have the effect of decreasing the overall thickness of the wing system 105 and decrease the amount of drag acting on the aircraft system 100. In a preferred embodiment, a support sheet may be placed between the internal structure 800 and at least one of the upper surface 805 and lower surface 810 so that the streamlined airfoil-contoured body 106 may better tolerate tension and compression loads. For instance, a corrugated sheet of metal may be placed between the internal structure 800 and at least one of the upper surface and lower surface 810 to provide greater structural stability of the wing system 105 without adding substantial weight. In another preferred embodiment, stiffeners may be placed spanwise between the chordwise members 820 of the internal structure 800 to increase structural stability. In yet another preferred embodiment, the leading-edge 106C and trailing-edge 106D of the streamlined airfoil-contoured body 106 are rounded and/or come to a point, which may increase the aerodynamic properties of the wing system 105.

In a preferred embodiment, the spanwise members 815 of the internal structure 800 are spars. Spars run parallel to the lateral axis of the aircraft system 100 and may be attached to the fuselage 110 via a fitting, such as a beam or a truss. The lateral axis is defined as the direction from the fuselage 110 toward the wingtip 106B of the streamlined airfoil-contoured body 106. Spars may be made from a single piece of material or multiple pieces of material and may designed to resist the bending forces endured by the streamlined airfoil-contoured body 106 as it is propelled through a fluid. In one preferred embodiment, spars may be constructed in a way such that should part of the spar fail, some other part of the spar may assume the load. For instance, a spar having a top cap, bottom cap, and a plurality of pylons operably connecting the top cap and bottom cap may be configured in a way such that should one pylon of the plurality of pylons fail, the remaining pylons may endure the additional load without failing. In embodiments comprising multiple spars, it is preferable to have one spar located near the leading-edge 106C and another spar near the trailing-edge 106D of the streamlined airfoil-contoured body 106.

In a preferred embodiment, the chordwise members 820 of the internal structure 800 comprises ribs. The ribs may transmit the tension and compression stresses acting on the upper surface 805 and lower surface 810 to the spanwise members, wherein the tension and compression stresses result from the forces acting on the streamlined airfoil-contoured body 106 as it is propelled through a fluid. In an embodiment, the ribs may extend from the leading-edge 106C to the trailing-edge 106D of the streamlined airfoil-contoured body 106, wherein each rib is a continuous unit that may interlink with a spanwise member 815 at a cross-section. Alternatively, the ribs may extend from at least one of the leading-edge 106C and trailing-edge 106D of the wing system 105 to a spanwise member 815, wherein each rib may attach to the spanwise member 815 at a linkage point. In a preferred embodiment, ribs may be made of wood or metal. In another preferred embodiment, ribs may be shaped in a way such that they give the streamlined airfoil-contoured body a cambered shape. In yet another preferred embodiment, ribs may comprise a gusset that provides greater structural stability with very little additional weight.

In a preferred embodiment, the spanwise members 815 and chordwise members 820 of the internal structure 800 may be strengthened by connecting each spanwise member 815 and chordwise member 820 via a plurality of wires that prevent sidewise bending of the internal structure 800. The plurality of wires may comprise drag wires and anti-drag wires. The wires within the plurality of wires designed to resist the backward forces experienced by the wing system 105 are called drag wires, and the wires within the plurality of wires designed to resist the forward forces experienced by the wing system 105 are called anti-drag wires. In another preferred embodiment, drag wires and anti-drag wires may be crisscrossed to form a truss within the internal structure 800, which may resist both forward forces and backward forces acting on the wing system 105. In yet another preferred embodiment, a compression strut may be inserted between the spanwise members to further increase the strength of the streamlined airfoil-contoured body 106.

The upper surface 805 and lower surface 810 comprise of a skin attached to the internal structure 800. Materials that may be used to construct the skin include, but are not limited to, fabric, wood, aluminum, and carbon fiber, or any combination thereof. In a preferred embodiment, the skin may be made of a hardened material so it may further increase the structural stability of the wing system 105. In another preferred embodiment, the skin may comprise of multiple layers of a single material or multiple materials. For instance, multiple layers of thin sheets of aluminum may be bound together to create the skin. For instance, layers of copper, rubber, and silicon may be bound together to create a composite skin. In yet another preferred embodiment, the thickness of the skin may be varied. For instance, the upper surface 805 and lower surface 810 at the wing root 106A of the wing system 105 may be thicker than the upper surface 805 and the lower surface 810 at the wingtip 106B of the wing system 105. In yet another preferred embodiment, the skin may comprise of a honeycomb structure bound between two or more sheets of a material.

The wingtip 106B is the part of the streamlined airfoil-contoured body 106 that is furthest from the fuselage 110 and may change how wingtip vortices interact with the aircraft system 100. Wingtip vortices are vortices caused by high pressure air from the lower surface 810 of the wing system 105 escaping around the wingtip 106B and moving towards the lower pressure area on the upper surface 805 of the wing system 105. Wingtip vortices cause the lift generated by the wing system 105 to be angled slightly backwards, effectively converting some lift into drag. In a preferred embodiment, the wingtip 106B is shaped such that it reduces the drag acting on the aircraft system 100 caused by wingtip vortices. For instance, the wingtip 106B may have a crescent shape to decrease drag. For instance, the wingtip 106B may have a raked shape to decrease drag and increase lift. For instance, the wingtip 106B may have a squared-off shape to increase roll performance. In a preferred embodiment, the wingtip 106B of the streamlined airfoil-contoured body 106 may be removed. Because wingtips 106B are often damaged, this allows a user to replace the wingtip 106B without having to replace the entire wing system 105. In another preferred embodiment, the wing system 105 may be coupled to the engine 115 in a way such that air from the engine 115 may be channeled through the streamlined airfoil-contoured body 106 and exit at the wingtip 106B. For instance, hot air from the engine 115 may be channeled through the leading-edge 106C of the streamlined airfoil-contoured body 106 from wing root 106A to wingtip 106B, wherein an aperture 205 on the upper surface 805 of the wingtip 106B may allow the warm air to be exhausted from the wing system 105. This may prevent ice from forming on the leading-edge 106C of the wing system 105, which may otherwise decrease lift and cause a stall.

In a preferred embodiment as illustrated in FIG. 1, the streamlined airfoil-contoured body 106 may further comprise cambered winglets 108 coupled to the wingtip 106B of the streamlined airfoil-contoured body 106, which may manipulate wingtip vortices acting on the wing system 105. In embodiments of an aircraft system 100 comprising a cambered winglet 108, it is preferable that the wingtip 106B have a squared-off shape. The cambered winglets 108 comprise an upper winglet surface, a lower winglet surface, a winglet root, and a winglet tip. The winglet root is configured in a way such that it seamlessly connects to the wingtip 106B of the wing system 105. In a preferred embodiment, the cambered winglet 108 is curved upwards such that the winglet tip is not in plane with the upper surface 805 of the wing system 105. This may increase the aspect ratio of the aircraft system 100 by increasing the area of the wing system 105 without significantly increasing the span. Because lift-to-drag ratio improves with a higher aspect ratio, an increased aerodynamic efficiency may be created for the wing system 105 by the addition of cambered winglets 108 to the wingtips 106B. In another preferred embodiment, the cambered winglet 108 may be attached to the wingtip 106B of the wing system 105 in a way such that the cambered winglet 108 may be removed. In yet another preferred embodiment, the wing system 105 and cambered winglet 108 are blended in way such that the cambered winglet 108 is seamlessly incorporated into the wing system 105.

Figure 5:
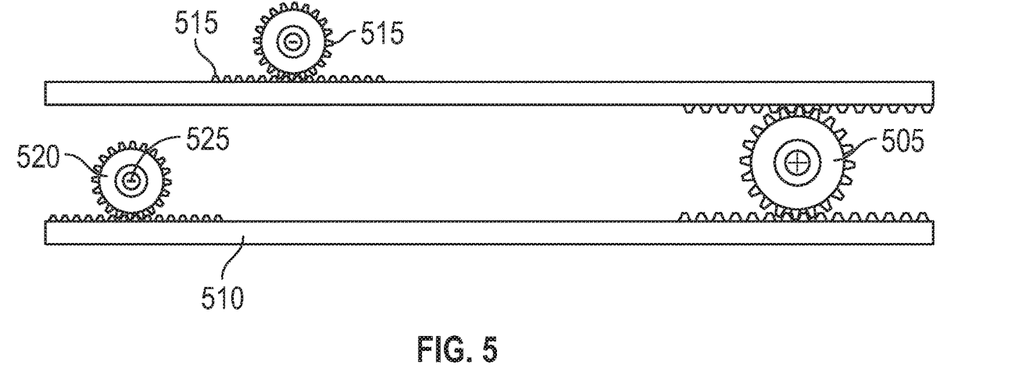
FIG. 5 shows an overhead view of an adjustable vortices device embodying features of the present invention.
Figure 6:
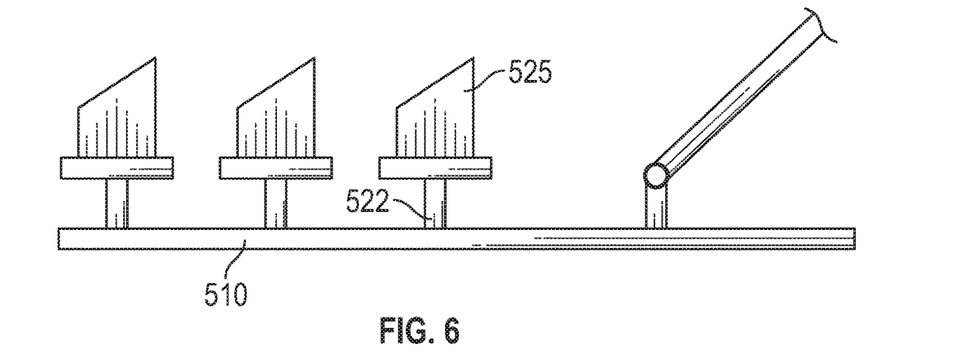
FIG. 6 shows a side view of an adjustable vortices device embodying features of the present invention.

The adjustable vortices device 107 may be operably connected to the streamlined airfoil-contoured body 106 in a way such that vortices are created, which effectively reduce the amount of drag acting on the aircraft system 100. The adjustable vortices device 107 comprises a linear actuator 500, a pivot mechanism 520, and a vortex generator 525. The linear actuator 500 may be configured to convert rotational energy into translational energy. Types of linear actuators 520 that may be used include, but are not limited to, belt driven, screw driven, hydraulic driven, pneumatically driven, rack-and-pinion driven, and linear motor driven. In a preferred embodiment as illustrated in FIGS. 5 and 6, the linear actuator 500 comprises a rack 510 and a pinion 505. The rack 510 has a linear shape and is defined by a plurality of teeth 515, whereas the pinion 505 has a circular shape and is also defined by a plurality of teeth 515. The plurality of teeth 515 of the rack 510 and the plurality of teeth 515 of the pinion 505 are oriented in a way such that they may interlock with one another. When the pinion 505 is rotated about a central axis, the plurality of teeth 515 of the rack 510 and plurality of teeth 515 of the pinion 505 may engage one another in a way that causes the rack 510 to advance in a linear direction.

In another preferred embodiment, a hydraulic device 211 may be operably connected to the rack 510 and pinion 505. The hydraulic device 211 may comprise a hydraulic pump, hydraulic fluid, hydraulic reservoir, control valves, a user control, an actuator connected to the hydraulic pump via a plurality of tubes, and a plurality of seals. The hydraulic pump supplies the hydraulic fluid to the various components of the hydraulic device 211. The control valves direct the hydraulic fluid to various locations of the hydraulic device 211 via the plurality of tubes. In a preferred embodiment, the pinion 505 is operably connected to the control valves in a way such that the direction of rotation of the pinion 505 instructs the control valve which route through the plurality of tubes the hydraulic fluid may take to the actuator. The actuator is responsible for moving objects using the work force generated by the pressure changes caused by the hydraulic fluid. The hydraulic reservoir holds hydraulic fluid not currently being used to operate the hydraulic device 211. The plurality of seals prevents the escape of hydraulic fluid from the hydraulic device 211.

In a preferred embodiment, the actuator comprises a hydraulic cylinder defined by an internal cavity, a slidably moveable piston disposed within the internal cavity, and a strut operably connected to the slidably moveable piston. The slidably moveable piston may be shaped in a way such that it creates two chambers within the cavity. In a preferred embodiment, the hydraulic cylinder may be operably connected to the linear actuator 500 in a way such that the direction of rotation of the pinion 505 manipulates the control valve so that it directs hydraulic fluid pumped by the hydraulic pump into one of a first chamber or a second chamber of the hydraulic cylinder. Pressure change resulting from hydraulic fluid being injected into the first chamber or second chamber acts on the slidably moveable piston, causing the slidably moveable piston to move in a direction from higher pressure to lower pressure. The strut is projected out the strut end of the hydraulic device 211 and is coupled to the rack 510. Operating the hydraulic device 211 to cause the slidably moveable piston to move in a direction from higher pressure to lower pressure causes the strut to move in a linear direction, which in turn causes the rack 510 to move in a linear direction.

Figure 7:
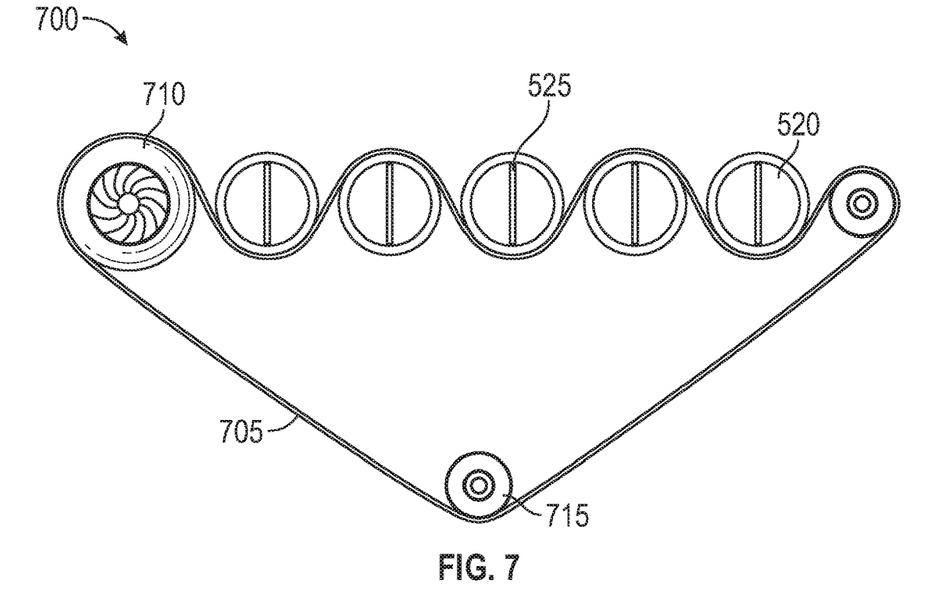
FIG. 7 shows an overhead view of an adjustable vortices device embodying features of the present invention.

In another preferred embodiment as illustrated in FIG. 7, the linear actuator 500 is a drive belt system 700. The drive belt system 700 comprises a motor 710 and a belt 705 operably connected to the motor 710. In a preferred embodiment, the belt 705 comprises a flexible strip of material. In another preferred embodiment, the belt 705 comprises a plurality of linked sections, wherein each linked section within the plurality of linked sections may rotate about a hinge connecting each linked section. In yet another embodiment, the belt 705 may comprise of a plurality of teeth 515. The motor 710 may be configured to operate in a way such that it causes the belt 705 to move in a continuous motion. A tension force applied to the belt 705 may prevent the belt 705 from slipping off the motor 710. In a preferred embodiment, the tension force used on the belt 705 is the lowest amount of force needed to prevent the belt 705 from slipping as the motor 710 moves the belt 705 in a continuous motion. In a preferred embodiment, tension on the belt 705 may be created by wrapping the belt 705 around the pivot mechanism 520. In another embodiment, a tension bearing 715 may be used to create tension and/or redirect the belt 705. In a preferred embodiment, the tension bearing 715 is a peg-like structure that may be rotated about a central axis by a belt 705 driven by a motor 710. In another preferred embodiment, the tension bearing may be defined by a plurality of teeth 515 designed to interlock with a plurality of teeth 515 of the belt 705.

The pivot mechanism 520 is operably connected to the linear actuator 500 in a way such that the translational energy of the linear actuator 500 may cause the pivot mechanism 520 to rotate about a central axis. In a preferred embodiment, the pivot mechanism 520 comprises a pinion 505 defined by a plurality of teeth 515 and a rod 522 perpendicularly disposed through the pinion 505. The plurality of teeth 515 of the pinion 505 are shaped such that they may interlock with a plurality of teeth 515 of the linear actuator 500. By operating the linear actuator 500 in a way that transforms rotational energy into translation energy, the movement of the linear actuator 500 in a linear direction may cause the plurality of teeth 515 of the linear actuator 500 to engage the plurality of teeth 515 of the pivot mechanism 520 and cause the pivot mechanism 520 may rotate about a central axis. For instance, a linear actuator 500 comprising a rack 510 and pinion 505 may have a plurality of teeth 515 disposed on the rack 510 in a way such that they interlock with the plurality of teeth 515 on the pivot mechanism 520. Forcing the rack 510 in a linear direction may cause the plurality of teeth 515 of the linear actuator 500 to engage the plurality of teeth 515 of the pivot mechanism 520, thus causing the pivot mechanism 520 to rotate about a central axis. For instance, a linear actuator 500 comprising a drive belt system 700 may have a plurality of teeth 515 disposed on the belt 705 in a way such that they interlock with the plurality of teeth 515 on the pivot mechanism 520. As the belt 705 is moved in a continuous motion by the motor 710, the plurality of teeth 515 of the belt 705 may engage the plurality of teeth 515 of the pivot mechanism 520, thus causing the pivot mechanism 520 to rotate about a central axis.

The vortex generator 525 may be coupled to the pivot mechanism 520 in a way such that rotating the pivot mechanism 520 may cause the vortex generator 525 to rotate about a central axis. In a preferred embodiment, the vortex generator 525 may comprise a streamlined fin that creates vortices as fluid moves off its trailing-edge 106D when propelled through a fluid. The vortices may remove part of the slow-moving boundary layer in contact with the surface having the slower average velocity, which may delay local flow separation (reduce drag) and aerodynamic stalling. In a preferred embodiment, the streamlined fin is straight and perpendicular to the surface having the slower average velocity. In an embodiment, the streamlined fin may be tapered such that one of the leading-edge 106C or trailing-edge 106D is thicker than the other. In another embodiment, the height of the streamlined fin may be tapered such that one of the leading-edge 106C or trailing-edge 106D is longer than the other.

Figure 2:
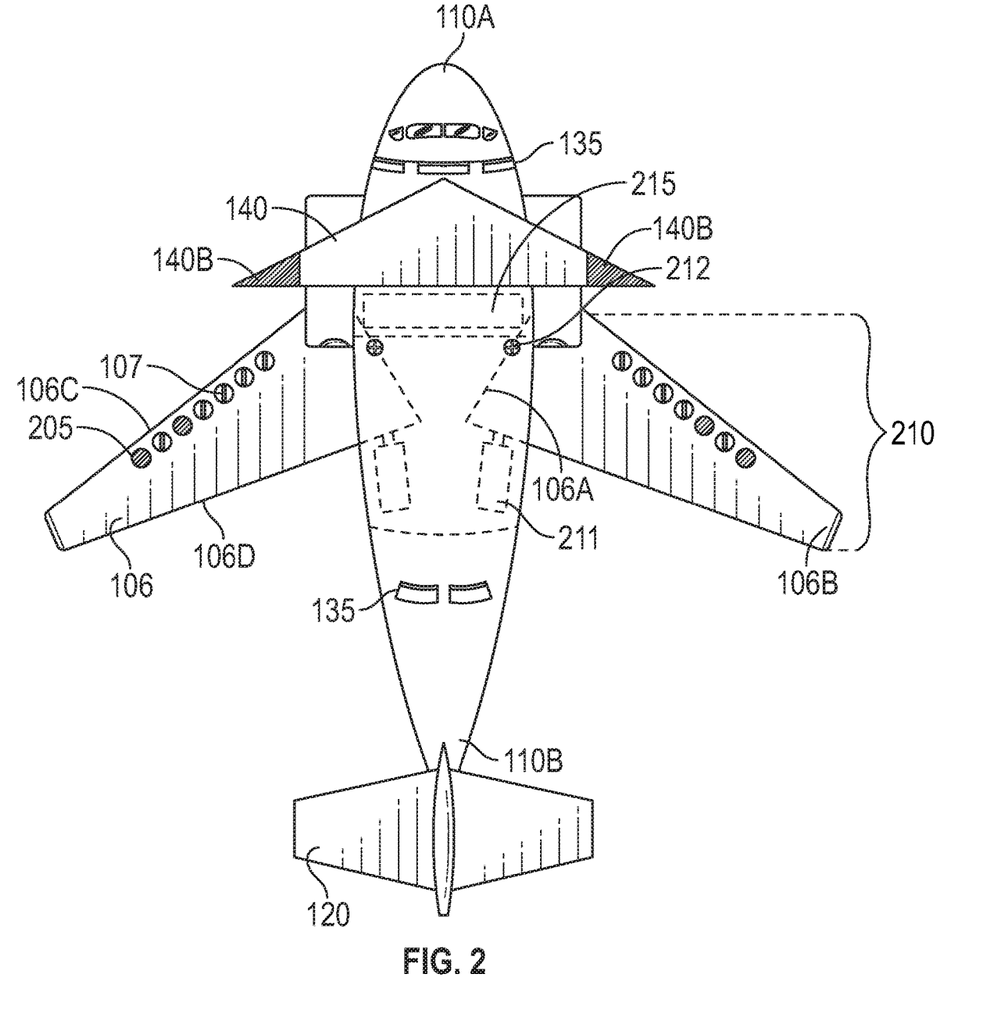
FIG. 2 shows an overhead view of an aircraft system embodying features of the present invention.

In one preferred embodiment, the linear actuator 500 and pivot mechanism 520 are disposed within the internal structure 800 of the streamlined airfoil-contoured body 106, and the vortex generator 525 is perched on at least one of the upper surface 805 and lower surface 810 of the streamlined airfoil-contoured body 106 in a way such that it may be moved about a central axis by the pivot mechanism 520. By operating the linear actuator, a user may force the vortex generator 525 to be rotated about a central axis on the upper surface 805 and/or lower surface 810 of the wing system 105. This may create various vortex effects on the upper surface and/or lower surface of wing system, which may minimize the amount of drag acting on the wing system 105. In yet another preferred embodiment as illustrated in FIGS. 2 and 8, the upper surface and/or lower surface of the wing system 105 may further comprise an aperture 205, allowing the vortex generator 525 to be ensconced within the streamlined airfoil-contoured body 106. The vortex generator 525 may be extended through the aperture 205 to the upper surface 805 and/or lower surface 810. In yet another preferred embodiment, an aperture cover may hide the aperture 205 and enhance aerodynamic flow over the wing system 105 when the vortex generator 525 is ensconced within the streamlined airfoil-contoured body 106. The aperture cover may be configured in a way such that it may be retracted before extension of the vortex generator 525 through the apertures 205 of the wing system 105.

The fuselage 110 is the main body of the aircraft system 100 and is defined by a forward end 110A and a tail end 110B. The fuselage 110 may comprise a framework and a casing covering the framework. The casing may be coupled to the framework in a way such that a rigid hollow body is formed. In a preferred embodiment, the framework may comprise a series of bulkheads, stringers, and longerons coupled together to create a scaffold. In another preferred embodiment, the fuselage 110 may have a cylindrical-like shape with a tapered nose on the forward end 110A. In yet another preferred embodiment, the fuselage 110 may be constructed in a way such that the wing system 105 may be coupled to the fuselage 110 via the root 106A of the wing system 105 and a wing-fuselage interface of the fuselage 110. The wing-fuselage interface may be covered such that aerodynamic properties for the aircraft system 100 are increased. For instance, a fairing may be used to cover the wing-fuselage interface. In yet another preferred embodiment, the fuselage 110 may further comprise a main fuel tank 215, wherein the main fuel tank 215 holds the propellant used by the engine 115 to propel the aircraft system 100 through a fluid.

A user control configured to operate the various systems of the aircraft system 100 may be contained within the fuselage 110. In a preferred embodiment, the user control is a computing device that is operably connected to the various systems of the aircraft system 100. Computing devices that may be used to operate the various systems of the aircraft system 100 may include, but are not limited to, laptops, desktops, workstations, personal digital assistants, servers, mainframes, cellular telephones, tablet computers, or any other similar device. For instance, a user may engage the computing device in a way that causes the computing device to send a signal to a hydraulic device 211 that controls a system of the aircraft system 100, which may cause that system to perform a function. In another preferred embodiment, the user control may be a switch operably connected to a system of the aircraft system 100, wherein engaging the switch may cause the system to perform a function. For instance, a user may flip a switch to eject an external fuel tank 130 from the aircraft system 100. In yet another preferred embodiment, the user control may be a control stick, wherein moving the control stick causes a system of the aircraft system 100 to perform a function in regards to flight control. For instance, a user may move the control stick in a way that causes a system to emit thrust in a direction that changes the attitude of the aircraft system 100. Therefore, a person with skill in the art will recognize that the user control may be any type of control that allows a user to operate the various systems of the aircraft system 100.

Figure 3:
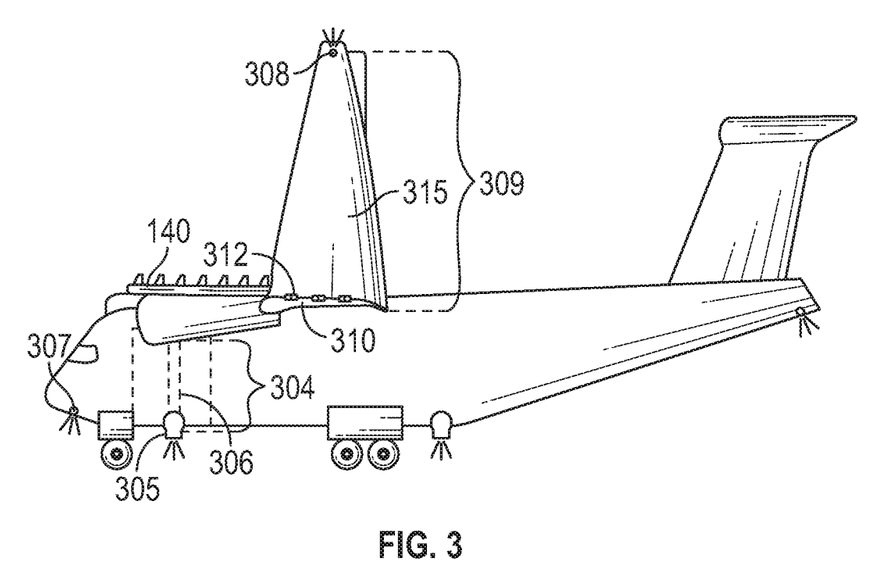
FIG. 3 shows a side view of an aircraft system embodying features of the present invention.

In another preferred embodiment as illustrated in FIG. 3, the streamlined airfoil-contoured body 106 may further comprise a first wing half 310 and a second wing half 315, wherein the first wing half 310 and the second wing half 315 are operably connected via a joint system 309. The first wing half 310 may comprise a first internal structure 800, a first upper surface 805, a first lower surface 810, a fuselage root 106A, and a first wing root 106A. The second wing half 315 may comprise a second internal structure 800, a second upper surface 805, a second lower surface 810, a second wing root 106A, and a wingtip 106B. The wing root 106A may be coupled to the fuselage 110 such that the first wing half 310 extends lengthwise along the traverse axis and the wing root 106A extends lengthwise along the longitudinal axis. The first wing root 106A of the first wing half 310 and the second wing root 106A of the second wing half 315 may be joined to create a wing system 105. In a preferred embodiment, the first wing root 106A of the first wing half 310 and the second wing root 106A of the second wing half 315 may be shaped such that they may be coupled together in a way such that the first upper surface 805 of the first wing half 310 and the second upper surface 805 of the second wing half 315 are in plane with one another, making one seamless upper surface 805. In another preferred embodiment, the linear actuator 500 may be dispersed within the first internal structure 800 of the first wing half 310. In yet another preferred embodiment, the first wing half 310 and second wing half may both contain a linear actuator 500.

The first wing half 310 and second wing half 315 may be joined via a joint system 309 comprising a hinge 312 and a hydraulic device 211, wherein the hinge 312 is attached to the first wing half 310 at the first wing root 106A and is attached to the second wing half 315 at the second wing root 106A. In a preferred embodiment, the second wing half 315 may be pivoted out of plane with the first wing half 310 about the hinge 312. The hydraulic device 211 may be disposed within the first internal structure 800 of the first wing half 310 and may be operably connected to the second wing half 315 of the wing system 105 in a way such that operation of the hydraulic device 211 may cause the second wing half 315 to rotate about the hinge 312 so that it is in an in-plane position and/or an out-of-plane position with the first wing half 310. In another preferred embodiment, the hydraulic device 211 may be configured to lock in a way such that the second wing half 315 is held in an in-plane position and/or an out-of-plane position with the first wing half 310.

The hydraulic device 211 may comprise a hydraulic pump, hydraulic fluid, hydraulic reservoir, control valves, actuator connected to the hydraulic pump via a plurality of tubes, and a plurality of seals. The actuator of the hydraulic device 211 preferably comprises a hydraulic cylinder defined by an internal cavity, a slidably moveable piston disposed within the internal cavity, and a strut operably connected to the slidably moveable piston. In a preferred embodiment, the piston creates a first chamber and a second chamber within the internal cavity of the hydraulic cylinder. The strut is projected out the strut end of the hydraulic device 211 and may be coupled to the second wing half 315. In a preferred embodiment, the control valve may be operably connected to a user control in a way such that a user may choose to force the second wing half 315 in plane or out of plane with the first wing half 310. By choosing to force the second wing half 315 in plane or out of plane with the first wing half 310, the user control may send a signal to the control valve, instructing it to direct hydraulic fluid pumped by the hydraulic pump into one of a first chamber or a second chamber of the hydraulic cylinder. Pressure change resulting from hydraulic fluid injected into the first chamber or second chamber may act on the slidably moveable piston, causing the slidably moveable piston to move in a direction from higher pressure to lower pressure, which in turn may cause the strut to move the second wing half 315 about the hinge 312, thus forcing the second wing half 315 into an in-plane position and/or out-of-plane position relative to the first wing half 310.

Figure 4:
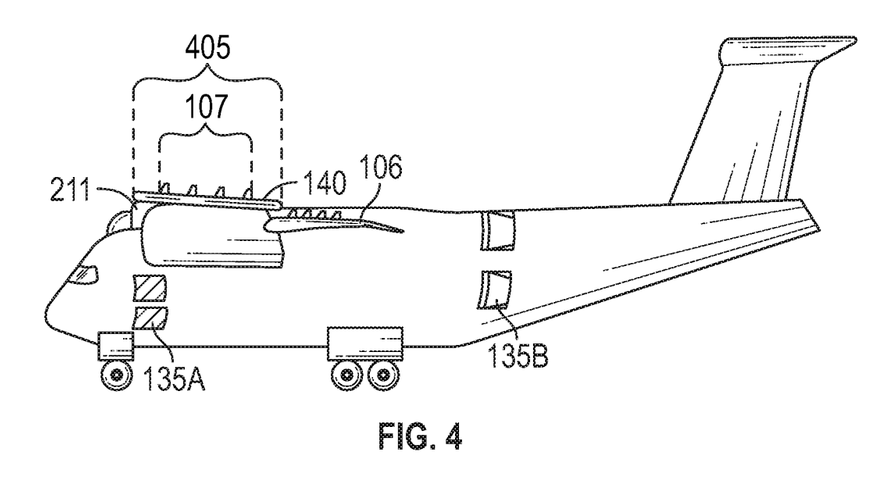
FIG. 4 shows a side view of an aircraft system embodying features of the present invention.

In another preferred embodiment as illustrated in FIG. 4, the aircraft system 100 may further comprise an angle adjustment mechanism 405. Because the angle of incidence allows for a higher angle of attack during takeoff and landing, the aircraft system 100 may take-off and land in shorter distances. The angle adjustment mechanism 405 may also be used to alter the angle of attack while being propelled through a fluid by the engine 115. The angle adjustment mechanism may be used to change the angle of incidence manually or automatically. For instance, a user may manually choose to change the angle of attack via the user control such that drag acting on the fuselage 110 is reduced. For instance, the aircraft system 100 may automatically increase the angle of incidence of the aircraft system 100 when the landing gear 125 is deployed in order to decrease stall speed of the aircraft system 100. For instance, the aircraft system 100 may automatically decrease the angle of incidence when the aircraft system 100 has reached a speed where the risk of a stall is minimal to decrease drag acting on the wing system 105.

The angle adjustment mechanism 405 preferably comprises a hydraulic device 211 and a rotation device coupled to the fuselage 110 and operably connected to the wing system 105. In a preferred embodiment, the rotation device is a hinge 312; however, one with skill in the art will recognize that the rotation device may be any device that will allow the wing system 105 to rotate about a central axis in relation to said fuselage 110 in a way such that the chord angle of the wing system 105 is changed. In another preferred embodiment, the hydraulic device 211 may be coupled to the wing system 105 in a way such that the leading-edge 106C of the wing system 105 may be moved about said rotation device in a way such that the angle of incidence of the aircraft system 100 is altered. In a preferred embodiment, the hydraulic device 211 may lock the wing system 105 in a desired position relative the fuselage 110, which in turn locks an angle of incidence for the aircraft system 100. In another preferred embodiment, an electronic lock may be used to lock wing system 105 in a desired position relative the fuselage 110.

The hydraulic device 211 may comprise a hydraulic pump, hydraulic fluid, a hydraulic reservoir, control valves, an actuator connected to the hydraulic pump via a plurality of tubes, and a plurality of seals. The actuator of the hydraulic device 211 preferably comprises a hydraulic cylinder defined by an internal cavity, a slidably moveable piston disposed within the internal cavity, and a strut operably connected to the slidably moveable piston. The strut is projected out the strut end of the hydraulic device 211 and may be coupled to the leading-edge 106C of the wing system 105. In a preferred embodiment, the control valve is operably connected to a user control such that the user may choose to force the leading-edge 106C of the wing system 105 to move about said rotation device to change the angle of incidence of the aircraft system. By choosing to force the wing system 105 to move about the vertical axis of the aircraft system 100, the user control may send a signal to the control valve instructing it to direct hydraulic fluid pumped by the hydraulic pump into one of a first chamber or a second chamber of the hydraulic cylinder. Pressure change resulting from hydraulic fluid being injected into the first chamber or second chamber acts on the slidably moveable piston, causing the slidably moveable piston to move in a direction from higher pressure to lower pressure, which in turn may cause the strut to move the leading-edge 106C of the wing system 105 about said rotation device, thus changing the angle of incidence of the aircraft system 100.

As shown in FIG. 2, the aircraft system 100 may further comprise a sweeping mechanism 210. The sweeping mechanism 210 may adjust the sweep angle of the wing system 105 in a way such that the wings may be placed in a swept forward position, straight position, and/or swept back position. The sweep angle is defined as the angle created by the line drawn from root 106A to wingtip 106B of the wing system 105 approximately twenty-five percent of the way from the leading-edge 106C and the line perpendicular to the longitudinal axis of the fuselage 110. A swept back position is a configuration of the wing system 105 in which the line drawn from root 106A to wingtip 106B is between the tail end 110B and the line perpendicular to the longitudinal axis of the fuselage 110. A straight position is a configuration of the wing system 105 in which the line drawn from root 106A to wingtip 106B overlaps the line perpendicular to the longitudinal axis of the fuselage 110. A swept forward position is a configuration of the wing system 105 in which the line drawn from root 106A to wingtip 106B is between the forward end 110A and the line perpendicular to the longitudinal axis of the fuselage 110.

The sweeping mechanism 210 may comprise a hydraulic device 211 and a wing pivot 212 coupled to the fuselage 110. The wing system 105 may be operably connected to the wing pivot 212 in a way such that the wing system 105 may rotate about the wing pivot 212 about the traverse axis of the aircraft system 100, thus changing the sweep angle of the wing system 105. The hydraulic device 211 may be attached to the fuselage 110 and operably connected to the wing system 105 in a way such that operation of the hydraulic device 211 may cause the wing system 105 to rotate about the wing pivot 212. The sweep angle of the aircraft system 100 may be changed manually or automatically by the sweeping mechanism 210. For instance, a user may manually choose to change the sweep angle of the wing system 105 via the user control. For instance, the aircraft system 100 may automatically adjust the sweep angle of the wing system 105 as the speed of aircraft system 100 changes as it moves through a fluid. In a preferred embodiment, the sweeping mechanism 210 may place the wing system 105 into either a straight position or a swept back position. In another preferred embodiment, the hydraulic device 211 may lock the wing system 105 in a swept forward position, straight position, and/or swept back position.

The hydraulic device 211 may comprise a hydraulic pump, hydraulic fluid, a hydraulic reservoir, control valves, an actuator operably connected to the hydraulic pump via a plurality of tubes, and a plurality of seals. The actuator of the hydraulic device 211 preferably comprises a hydraulic cylinder defined by an internal cavity, a slidably moveable piston disposed within the internal cavity, and a strut operably connected to the slidably moveable piston. The strut is projected out the strut end of the hydraulic device 211 and is coupled to the wing system 105. In a preferred embodiment, the control valve may be operably connected to a user control such that the user may choose to force the wing system 105 to rotate about the wing pivot 212. By choosing to force the wing system 105 to rotate about the wing pivot 212, the user control may send a signal to the control valve instructing it to direct hydraulic fluid pumped by the hydraulic pump into one of a first chamber or a second chamber of the hydraulic cylinder. Pressure change resulting from hydraulic fluid being injected into the first chamber or second chamber may act on the slidably moveable piston, causing the slidably moveable piston to move in a direction from higher pressure to lower pressure, which may cause the strut to rotate the wing system 105 about the wing pivot 212, thus changing the sweep angle of the wing system 105.

In the preferred embodiment as illustrated in FIG. 1, the aircraft system 100 may further comprise an external fuel tank 130. In a preferred embodiment, the external fuel tank 130 may be removeable from the aircraft system 100. The external fuel tank 130 may be configured to provide propellant to a main fuel tank 215 of the aircraft system 100. In a preferred embodiment, propellant transfer from the external fuel tank 130 to the main fuel tank 215 may be accomplished by pumping pressurized air from the engine 115 into the external fuel tank 130, which may increase pressure within the external fuel tank 130. The increased pressure may force the propellant out of the external fuel tank 130 through a fueling valve operably connected to the main fuel tank 215 via a fueling tube. The transfer of propellant from the external fuel tank 130 to the main fuel tank 215 may be done at a constant rate or a variable rate. The transfer of propellant from the external fuel tank 130 to the main fuel tank 215 may be automatic or manual. For instance, the transfer of propellant from the external fuel tank 130 to the main fuel tank 215 may be automatically sequenced such that retracting the landing gear 125 causes propellant to transfer from the external fuel tank 130 to the main fuel tank 215 at a constant rate. For instance, the transfer of propellant from the external fuel tank 130 to the main fuel tank 215 may be manually initiated at a transfer rate chosen by a user via the user control.

As mentioned previously, the external fuel tank 130 is preferably removable. The removal of the external fuel tank 130 from the aircraft system 100 may be done manually and/or automatically. For instance, a user may manually remove an external fuel tank 130 from a wing system 105 using tools designed for the addition or removal of the external fuel tank 130 to an aircraft system 100. For instance, a user may manually choose to jettison the external fuel tank 130 from the aircraft system 100 via the user control when it is necessary to reduce drag or the total weight of the aircraft system 100 caused by the addition of external fuel tank 130. For instance, the external fuel tank 130 may be jettisoned automatically from the aircraft system 100 when the propellant has been transferred from the external fuel tank 130 to the main fuel tank 215. In a preferred embodiment, a pyrotechnic fastener or electronic lock operably connected to the user control and external fuel tank 130 may be manipulated to jettison the external fuel tank 130 from the aircraft system 100. A pyrotechnic fastener is a bolt or nut that incorporates a pyrotechnic charge that may be detonated to break the bolt or nut into multiple pieces, thus uncoupling whatever is coupled by the pyrotechnic fastener. An electric current sent by the user control or a switch may activate/deactivate the pyrotechnic fastener or electronic lock. For instance, a user may manually flip a switch that sends an electric charge to a pyrotechnic fastener coupling the external fuel tank 130 to the fuselage 110, which detonates the pyrotechnic fastener, thus causing the external fuel tank 130 to be jettisoned from the aircraft system 100. For instance, a user may manually choose to deactivate an electronic lock operably connected to an external fuel tank 130 and fuselage 110 using the user control, wherein the user control sends an electronic signal to the electronic lock instructing it to deactivate, thus causing the external fuel tank 130 to be jettisoned from the aircraft system 100.

In yet another preferred embodiment, as illustrated in FIGS. 1, 2, and 4, the aircraft system 100 may further comprise an airbrake system. The airbrake system comprises at least one panel 135, a hinge 312 coupled to the fuselage 110, and a hydraulic device 211. The at least one panel 135 is shaped in a way such that when making face sharing contact with the fuselage 110, the at least one panel 135 conforms to the fuselage 110. The hinge 312 may be operably connected to the at least one panel 135 in a way such that the at least one panel 135 may rotate about a central axis, allowing the at least one panel 135 to rotate out of face sharing contact with the fuselage 110. The airbrake system may be deployed manually and/or automatically. For instance, a user may manually choose to deploy the airbrake system via the user control. For instance, the aircraft system 100 may automatically deploy the airbrake system when the landing gear 125 breaks are engaged. In a preferred embodiment, the hydraulic device 211 may be used lock the airbrake system in face sharing contact with the fuselage 110 or out of face sharing contact with the fuselage 110.

In a preferred embodiment, the airbrake system may comprise a frilled airbrake 135A and a rear airbrake 135B. The frilled airbrake 135A is disposed around the fuselage 110 and is forward of the rear airbrake 135B, which is also disposed around the fuselage 110. In another preferred embodiment, the frilled airbrake 135A and rear airbrake 135B are disposed around the fuselage 110 in a way such that the at least one panel 135 of the frilled airbrake 135A overlaps the at least one panel 135 of the rear airbrake 135B when rotated out of face sharing contact with the fuselage 110. The frilled airbrake 135A and rear airbrake 135B may be deployed independent from one another. For instance, a user may choose to deploy only the frilled airbrake 135A via the user control. For instance, the aircraft system 100 may automatically deploy the rear airbrake 135B system when thrust produced by the engine 115 is directed opposite the forward motion of the aircraft system 100. Alternatively, the frilled airbrake 135A and rear airbrake 135B may be deployed simultaneously. For instance, a user may choose to simultaneously deploy the frilled airbrake 135A and rear airbrake 135B via the user control when a sudden reduction in speed of the aircraft system 100 is desired.

The hydraulic device 211 may be coupled to the fuselage 110 and operably connected to the at least one panel 135 of the airbrake system in a way such that operation of the hydraulic device 211 may cause the at least one panel 135 to rotate about the hinge 312. The actuator of the hydraulic device 211 preferably comprises a hydraulic cylinder defined by an internal cavity, a slidably moveable piston disposed within the internal cavity, and a strut operably connected to the slidably moveable piston. The strut is projected out the strut end of the hydraulic device 211 and is coupled to the at least one panel 135 of the airbrake system. In a preferred embodiment, the control valve may be operably connected to a user control such that the user may choose to force the at least one panel 135 of the airbrake system to be in face sharing contact with the fuselage 110 or out of face sharing contact with the fuselage 110. By choosing to engage the airbrake system, the user control may send a signal to the control valve instructing it to direct hydraulic fluid pumped by the hydraulic pump into one of a first chamber or a second chamber of the hydraulic cylinder. Pressure change resulting from hydraulic fluid being injected into the first chamber or second chamber may act on the slidably moveable piston, causing the slidably moveable piston to move in a direction from higher pressure to lower pressure, which may cause the strut to rotate the at least one panel 135 about the hinge 312, thus forcing the at least one panel 135 into face sharing contact with the fuselage 110 or out of face sharing contact with the fuselage 110.

In the preferred embodiment as illustrated in FIG. 3, the aircraft system 100 may further comprise a control jet system 304 operably connected to the engine 115. The control jet system 304 comprises a nozzle 305, a nozzle pivot, and an engine duct 306. The nozzle 305 is operably connected to a nozzle pivot, wherein said nozzle pivot is coupled to an engine duct 306 of the fuselage 110. Pressurized air from the engine 115 may be directed through the engine duct 306 to the nozzle 305 to provide the thrust necessary to propel the aircraft system 100 through a fluid. The nozzle 305 is connected to the nozzle pivot in a way such that the nozzle 305 may rotate about the nozzle pivot. In one preferred embodiment, the nozzle 305 may be rotated about the nozzle pivot in a way such that the nozzle 305 may be placed in a position to direct compressed air from the engine 115 downward along the vertical axis, which may provide thrust about the vertical axis of the aircraft system 100. The nozzle 305 may be rotated about the nozzle pivot manually or automatically. For instance, a user may manually choose to rotate the nozzle 305 about the nozzle pivot via a user control. For instance, the aircraft system 100 may automatically rotate the nozzle 305 about the nozzle pivot such that the nozzle may provide thrust about the vertical axis when the aircraft system 100 detects a stall.

In a preferred embodiment of an aircraft system 100 having a control jet system 304, the engine 115 may be a turbofan jet engine comprising a fan, diffuser, low pressure compressor, high pressure compressor, combustion chamber, low pressure turbine, and high-pressure turbine. The fan may pull air into the control jet system 304, which may be directed towards the diffuser, which slows the velocity of the air entering the control jet system 304. The air may then be directed from the diffuser to the low-pressure compressor where it is initially compressed. Once compressed by the low-pressure compressor, the air may be directed towards the high-pressure compressor and/or a nozzle 305 located forward of the center of gravity of the aircraft system 100. Compressed air directed towards the nozzle 305 may be used to provide thrust to the aircraft system 100 while compressed air directed to the high-pressure compressor may be further compressed and directed towards the combustion chamber. Resulting gasses from the combustion of propellant within the combustion chamber may be directed to the high-pressure turbine and low-pressure turbine. Once the gasses have exited the low-pressure turbine, the gasses may be directed toward a nozzle 305 located behind the center of gravity of the aircraft system 100, which may be used in conjunction with the nozzle 305 located forward of the center of gravity of the aircraft system 100 to provide thrust to the aircraft system 100.

In another preferred embodiment of an aircraft system 100 having a control jet system 304, a pitch valve 307 located on the fuselage 110 and a roll valve 308 located on the wing system 105 may be used to keep the attitude of the aircraft system 100 constant. The pitch valve 307 and roll valve 308 may be operably connected to the engine 115 in a way such that compressed air from the engine may be directed to the pitch valve and roll valve. Compressed air may be expelled from the pitch valve or roll valve to provide thrust that may affect the attitude of the aircraft system. For instance, compressed air expelled from the roll valve may affect the amount of roll the system is experiencing. In the preferred embodiment of the aircraft system 100 comprising a turbofan jet engine, the pitch valve 307 and roll valve 308 may be operably connected to the high-pressure compressor in a way such that high pressure air may be expelled from the pitch valve 307 and roll valve 308 to control the attitude of the aircraft system 100.

In yet another preferred embodiment of a control jet system 304, the nozzle 305 may be rotated about the nozzle pivot via a hydraulic device 211. The actuator of the hydraulic device 211 preferably comprises a hydraulic cylinder defined by an internal cavity, a slidably moveable piston disposed within the internal cavity, and a strut operably connected to the slidably moveable piston. The strut is projected out the strut end of the hydraulic device 211 and is coupled to the nozzle 305 of the control jet system 304. In a preferred embodiment, the control valve may be operably connected to a user control such that the user may choose to force the nozzle 305 to move about the nozzle pivot. By choosing to rotate the nozzle 305, the user control may send a signal to the control valve instructing it to direct hydraulic fluid pumped by the hydraulic pump into one of a first chamber or a second chamber of the hydraulic cylinder. Pressure change resulting from hydraulic fluid being injected into the first chamber or second chamber may act on the slidably moveable piston, causing the slidably moveable piston to move in a direction from higher pressure to lower pressure, which may cause the strut to move in a linear direction, thus forcing the nozzle 305 to rotate about the nozzle pivot.

In the preferred embodiment as illustrated in FIGS. 1-4, the aircraft system 100 may further comprise a forewing 140 coupled to the fuselage 110 and forward of the wing system 105. The forewing 140 is attach to the aircraft system 100 along the traverse axis and comprises a streamlined airfoil-contoured body 106 that generates lift when propelled through a fluid at an angle of incidence of at least zero. The streamlined airfoil-contoured body 106 is defined by an internal structure 800, an upper surface 805 coupled to the internal structure 800, and a lower surface 810 coupled to the internal structure 800. The streamlined airfoil-contoured body 106 of the forewing 140 may be arranged in a way such that the fluid moves at a higher average velocity over the upper surface 805 and at a lower average velocity over the lower surface 810. The shape of the forewing 140 may be asymmetric or symmetric. In a preferred embodiment of an aircraft system 100 using a forewing 140, the center of lift of the wing system 105 is located behind the center of gravity of the aircraft system 100 and the center of lift of the forewing 140 is located forward of the center of gravity of the aircraft system 100.

In another preferred embodiment, the forewing 140 is shaped as a delta wing. In one version of an aircraft system 100 comprising a forewing 140 shaped as a delta wing, the center of gravity of the aircraft system 100 may be located closer to the tail end 110B of the aircraft system 100. In another preferred embodiment, the forewing 140 is located on the fuselage 110 in a higher position about the vertical axis than the wing system 105. In yet another preferred embodiment, the forewing 140 and wing system 105 are closely coupled to the fuselage 110 such that vortices produced by the forewing 140 mix fast moving air from above the wing system 105 into the boundary layer of the wing system 105. This further energizes the boundary layer of the wing system 105 and delays boundary layer separation, which decreases drag and increases lift. In another preferred embodiment, the user control may automatically adjust the angle of attack of the forewing 140 to prevent a stall or exit a stall once the aircraft system 100 has entered one. This is especially effective in aircraft systems 100 comprising a forewing 140 shaped as a delta wing and having a center of gravity towards the tail end 110B of the aircraft system 100 because the user control can quickly manipulate the forewing 140 to correct the pitch of the aircraft system 100 and lower the angle of attack of the wing system 105. In yet another embodiment of a forewing 140, the forewing tips 140B may be adjustable such that longitudinal control may be further enhanced. In a preferred embodiment having forewings 140 operably connected to the fuselage 110, the forewing tips 140B may be manipulated in a way such that all longitude control for the aircraft system 100 is generated by the forewing. Therefore, in some preferred embodiments of an aircraft system 100, no horizontal stabilizers 120 are needed.

In one preferred embodiment, the forewing 140 may be coupled to an angle adjustment mechanism 405 such that the angle of incidence of the forewing 140 may be changed. In some embodiments, the forewing 140 may provide longitudinal control and stability to the aircraft system 100. Therefore, in some embodiments of the aircraft system 100, no aeronautic stabilizer 120 needs to be coupled to the fuselage 110 along the traverse axis. An aeronautic stabilizer 120 may be coupled to the fuselage 110 about the vertical axis of the aircraft system 100 to provide directional control and directional stability to the aircraft system 100. In another preferred embodiment, the forewing 140 and wing system 105 may be configured in a way such that the critical angle of attack for the forewing 140 is reached before the critical angle of attack for the wing system 105, which may prevent an unrecoverable stall from occurring. The critical angle of attack is defined as the maximum angle the wing system 105 and forewing 140 may proceed through a fluid before there is a decrease in lift.

The implementations set forth in the foregoing description do not represent all implementations consistent with the subject matter described herein but are examples consistent with the disclosed subject matter. Although variations have been described in detail above, other modifications or additions may be possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, materials, and arrangements of the parts and method stages which have been described and illustrated in order to explain the nature of this inventive subject matter may be made without departing from the principles and scope of the present disclosure.

What is claimed is:

1. An aircraft system comprising:
    a fuselage,
    a wing system coupled to said fuselage, wherein said wing system comprises:
        a streamlined airfoil-contoured body that generates lift when propelled through a fluid at an angle of incidence of at least zero, wherein said streamlined airfoil-contoured body is defined by,
        an internal structure,
        an upper surface coupled to said internal structure, and
        a lower surface coupled to said internal structure,
        wherein said streamlined airfoil-contoured body is arranged such that said fluid moves at a higher average velocity over said upper surface and at a lower average velocity over said lower surface,
    an adjustable vortices device operably connected to said streamlined airfoil-contoured body, wherein said adjustable vortices device comprises:
        a rack and pinion configured to convert between rotational motion and translational motion,
        a pivot mechanism operably connected to said rack and pinion,
            wherein said translational motion of a rack of said rack and pinion causes a pinion of said rack and pinion to rotate said pivot mechanism about a central axis using said rotational motion, and
        a vortex generator coupled to said pivot mechanism,
            wherein rotating said pivot mechanism causes said vortex generator to rotate about said central axis,
    a landing gear coupled to said fuselage,
    an aeronautic stabilizer coupled to said fuselage along at least one of a traverse axis and vertical axis, and
    an engine configured to produce thrust and coupled to at least one of said fuselage and said wing system,
        wherein said thrust propels said aircraft system such that fluid moves over said wing system and generates said lift.

2. The system of claim 1, wherein said rack of said rack and pinion is linear and defined by a plurality of teeth, wherein said pinion of said rack and pinion is circular and defined by said plurality of teeth, wherein said plurality of teeth of said rack and said pinion are oriented to interlock such that rotating said pinion about said central axis causes said rack to advance in a linear direction.

3. The system of claim 2, further comprising a piston operably connected to said rack and pinion,
    wherein said piston advances said rack such that said pivot mechanism rotates about said central axis.

4. The system of claim 1, wherein said rack and pinion is disposed within said internal structure.

5. The system of claim 1, wherein said vortex generator is perched on at least one of said upper surface and said lower surface.

6. The system of claim 1, further comprising an aperture on at least one of said upper surface and said lower surface,
    wherein said vortex generator is ensconced within said streamlined airfoil-contoured body,
    wherein said vortex generator extends through said aperture to at least one of said upper surface and said lower surface.

7. The system of claim 1, wherein said streamlined airfoil-contoured body further comprises:
    a joint system having a hinge,
        wherein a second wing half of said wing system is pivoted out of plane with a first wing half of said wing system about said hinge,
    a hydraulic device disposed within said internal structure and operably connected to said first wing half and said second wing half of said wing system,
        wherein said hydraulic device pivots said second wing half about said hinge,
        wherein said hydraulic device is configured to hold said second wing half in at least one of said in-plane position and said out-of-plane position.

8. The system of claim 1, further comprising cambered winglets on a wingtip of said streamlined airfoil-contoured body, wherein said cambered winglets convert wingtip vortex energy into said lift.

9. The system of claim 1, further comprising an external fuel tank operably connected to said aircraft system,
    wherein said external fuel tank provides propellant to said engine,
    wherein said external fuel tank is detachable from said aircraft system.

10. The system of claim 1, further comprising an angle adjustment mechanism,
    wherein said angle adjustment mechanism aligns said wing system such that said angle of incidence of said wing system is altered,
    wherein said fuselage maintains a constant attitude as said angle adjustment mechanism alters said angle of incidence of said wing system.

11. The system of claim 1, further comprising a sweeping mechanism,
    wherein said sweeping mechanism adjusts said wing system such that said wing system is placed in at least one of a straight position, a swept back position, and a swept forward position.

12. The system of claim 1, further comprising an airbrake system having a frilled airbrake disposed around said fuselage and forward of a rear airbrake disposed around said fuselage,
    wherein said frilled airbrake and said rear airbrake are spaced about said fuselage such that said frilled airbrake overlaps said rear airbrake about a longitudinal axis of said aircraft system when deployed.

13. The system of claim 1, further comprising a control jet system operably connected to said engine,
    wherein compressed air from said engine is directed to a nozzle of said control jet system,
    wherein said nozzle is rotatable such that swiveling said nozzle about said fuselage positions said nozzle in a position to expel said compressed air downward along a vertical axis of said aircraft system.

14. The system of claim 1, further comprising a forewing coupled to said fuselage and forward of said wing system,
   wherein a center of lift of said wing system is located behind a center of gravity of said aircraft system,
   wherein said forewing and said wing system are configured such that a critical angle of incidence for said wing system is reached before said critical angle of incidence is reached for said forewing.

15. A wing system comprising:
   a streamlined airfoil-contoured body that generates lift when propelled through a fluid at an angle of incidence of at least zero, wherein said streamlined airfoil-contoured body is defined by,
      an internal structure,
      an upper surface coupled to said internal structure, and
      a lower surface coupled to said internal structure,
      wherein said streamlined airfoil-contoured body is arranged such that said fluid moves at a higher average velocity over said upper surface and at a lower average velocity over said lower surface,
   an adjustable vortices device operably connected to said streamlined airfoil-contoured body, wherein said adjustable vortices device comprises:
      a rack and pinion configured to convert between rotational motion and translational motion,
      a pivot mechanism operably connected to said rack and pinion,
         wherein said translational motion of a rack of said rack and pinion causes a pinion of said rack and pinion to rotate said pivot mechanism about a central axis using said rotational motion, and
      a vortex generator coupled to said pivot mechanism,
         wherein rotating said pivot mechanism causes said vortex generator to rotate about said central axis.

16. The system of claim 15, wherein said rack of said rack and pinion is linear and defined by a plurality of teeth, wherein said pinion of said rack and pinion is circular and defined by said plurality of teeth, wherein said plurality of teeth of said rack and said pinion are oriented to interlock such that rotating said pinion about said central axis causes said rack to advance in a linear direction.

17. The system of claim 16, further comprising a piston operably connected to said rack and pinion,
   wherein said piston advances said rack such that said pivot mechanism rotates about said central axis.

18. The system of claim 15, wherein said rack and pinion is disposed within said internal structure.

19. The system of claim 15, wherein said vortex generator is perched on at least one of said upper surface and said lower surface.

20. The system of claim 15, further comprising an aperture on at least one of said upper surface and said lower surface,
   wherein said vortex generator is ensconced within said streamlined airfoil-contoured body,
   wherein said vortex generator extends through said aperture to at least one of said upper surface and said lower surface.

21. The system of claim 15, wherein said streamlined airfoil-contoured body further comprises:
   a joint system having a hinge,
      wherein a second wing half of said wing system is pivoted out of plane with a first wing half of said wing system about said hinge,
   a hydraulic device disposed within said internal structure and operably connected to said first wing half and said second wing half of said wing system,
      wherein said hydraulic device pivots said second wing half about said hinge,
      wherein said hydraulic device is configured to hold said second wing half in at least one of said in-plane position and said out-of-plane position.

22. The system of claim 15, further comprising cambered winglets on a wingtip of said streamlined airfoil-contoured body, wherein said cambered winglets convert wingtip vortex energy into said lift.

23. The system of claim 15, further comprising an external fuel tank operably connected to said aircraft system,
   wherein said external fuel tank provides propellant to an engine,
   wherein said external fuel tank is detachable from said aircraft system.

24. An adjustable vortices device for producing a turbulent boundary layer comprising:
   a linear actuator having a rack and a pinion,
      said rack being linear and defined by a plurality of teeth,
      said pinion being circular and defined by said plurality of teeth,
      wherein said plurality of teeth of said rack and said pinion are oriented to interlock such that rotating said pinion about a central axis causes said rack to advance in a linear direction,
   a pivot mechanism operably connected to said linear actuator,
      wherein advancing said rack in said linear direction causes said pivot mechanism to rotate about said central axis, and
   a vortex generator coupled to said pivot mechanism,
      wherein rotation of said pivot mechanism causes said vortex generator to rotate about said central axis.

25. The system of claim 24, further comprising a piston operably connected to said linear actuator,
   wherein said piston advances said rack such that said pivot mechanism rotates about said central axis.

26. The system of claim 24, further comprising an extension device operably connected to said pivot mechanism, said extension device comprises:
   an extendable portion defined by axially aligned threads,
   a spindle portion defined by said axially aligned threads,
      wherein said axially aligned threads of said extendable portion and said spindle portion are oriented such that said axially aligned threads interlock,
      wherein said extendable portion is seated within said spindle portion,
   a drive operably connected to said extendable portion,
      wherein operation of said drive causes said axially aligned threads of said extendable portion and said spindle portion to interact such that said extendable portion protracts and retracts, and
   a locking mechanism that engages said drive such that said extendable portion is held in place.

* * * * *